US011279251B2

(12) United States Patent
Muramatsu et al.

(10) Patent No.: US 11,279,251 B2
(45) Date of Patent: Mar. 22, 2022

(54) CHARGING SYSTEM

(71) Applicants: TOYOTA JIDOSHA KABUSHIKI KAISHA, Toyota (JP); CHUBU ELECTRIC POWER CO., INC., Nagoya (JP)

(72) Inventors: Makito Muramatsu, Toyota (JP); Takumi Shibano, Nagoya (JP); Masashi Tanaka, Nagakute (JP); Takashi Ochiai, Nagoya (JP); Takeharu Fukui, Nagoya (JP); Yoshihiro Takamura, Nagoya (JP); Takahiro Yokogawa, Nagoya (JP); Masashi Ohgashira, Nagoya (JP)

(73) Assignees: TOYOTA JIDOSHA KABUSHIKI KAISHA, Toyota (JP); CHUBU ELECTRIC POWER CO., INC., Nagoya (JP)

( * ) Notice: Subject to any disclaimer, the term of this patent is extended or adjusted under 35 U.S.C. 154(b) by 170 days.

(21) Appl. No.: 16/713,274

(22) Filed: Dec. 13, 2019

(65) Prior Publication Data

US 2020/0198487 A1    Jun. 25, 2020

(30) Foreign Application Priority Data

Dec. 21, 2018    (JP) .............................. JP2018-240109

(51) Int. Cl.
*B60L 53/30*    (2019.01)
*G06Q 30/04*    (2012.01)
(Continued)

(52) U.S. Cl.
CPC ............. *B60L 53/305* (2019.02); *B60L 53/62* (2019.02); *B60L 58/13* (2019.02); *G06Q 30/04* (2013.01);
(Continued)

(58) Field of Classification Search
CPC ........ B60L 53/305; B60L 53/62; B60L 58/13; B60L 2240/80; B60L 2250/16;
(Continued)

(56) References Cited

U.S. PATENT DOCUMENTS 8,717,170 B1 *    5/2014    Juhasz .................... B60L 53/66
                                                              340/540
9,180,783 B1 *    11/2015    Penilla ................... B60L 53/80
(Continued)

FOREIGN PATENT DOCUMENTS

JP    2012244785 A    12/2012
JP    2013041324 A    2/2013
JP    2013153604 A    8/2013

*Primary Examiner* — Nha T Nguyen
(74) *Attorney, Agent, or Firm* — Dickinson Wright, PLLC

(57) ABSTRACT

A charging system includes a vehicle, a power supply facility, a mobile terminal, and a server. The power supply facility performs external charging by supplying power to the vehicle. The mobile terminal receives a user input from a user of the vehicle and provides a notification to the user. The server communicates with the mobile terminal. The mobile terminal sets a first notification condition in the server in response to the user input. A second notification condition is set in the server in advance. The server determines whether or not each of the first notification condition and the second notification condition is satisfied during the external charging. When the first notification condition is satisfied, the server provides a first notification to the user through the mobile terminal. When the second notification condition is satisfied, the server provides a second notification to the user through the mobile terminal.

7 Claims, 8 Drawing Sheets

(51) Int. Cl.
  *H04W 68/00* (2009.01)
  *B60L 53/62* (2019.01)
  *H02J 7/00* (2006.01)
  *B60L 58/13* (2019.01)

(52) U.S. Cl.
  CPC ......... *H02J 7/0048* (2020.01); *H04W 68/005* (2013.01)

(58) Field of Classification Search
  CPC ........ B60L 53/68; G06Q 30/04; G06Q 50/06; G06Q 50/10; H04W 68/005; H02J 7/0048; Y02T 90/12; Y02T 90/14; Y02T 10/7072; Y02T 10/70; Y02T 90/16
  See application file for complete search history.

(56) References Cited

U.S. PATENT DOCUMENTS

| | | | | |
|---|---|---|---|---|
| 9,545,853 | B1* | 1/2017 | Penilla | B60L 53/31 |
| 10,500,977 | B2* | 12/2019 | Anzicek | B60L 53/31 |
| 10,525,845 | B2* | 1/2020 | Pursifull | B60L 53/14 |
| 10,552,923 | B2* | 2/2020 | Cun | B60L 53/665 |
| 2012/0197693 | A1* | 8/2012 | Karner | B60L 53/31 705/14.1 |
| 2013/0110296 | A1* | 5/2013 | Khoo | B60L 53/66 700/286 |
| 2013/0138542 | A1* | 5/2013 | Sirton | G06Q 50/06 705/34 |
| 2013/0162221 | A1* | 6/2013 | Jefferies | B60L 53/31 320/155 |
| 2013/0179061 | A1* | 7/2013 | Gadh | B60L 55/00 701/123 |
| 2013/0179383 | A1* | 7/2013 | Pringle | G06N 5/02 706/46 |
| 2014/0021908 | A1* | 1/2014 | McCool | B60L 53/36 320/108 |
| 2014/0089016 | A1* | 3/2014 | Smullin | G06Q 10/02 705/5 |
| 2015/0022161 | A1* | 1/2015 | Chauhdary | B60L 53/64 320/162 |
| 2016/0019492 | A1* | 1/2016 | Juhasz | G06Q 50/06 705/7.15 |
| 2016/0364658 | A1* | 12/2016 | Khoo | G06F 1/26 |
| 2020/0001736 | A1* | 1/2020 | Imai | B60L 53/66 |
| 2020/0016985 | A1* | 1/2020 | Sham | B60L 53/63 |
| 2021/0146794 | A1* | 5/2021 | Ruan | B60L 53/62 |

* cited by examiner

FIG.7

| COUPON DISCOUNT MONETARY AMOUNT | NUMBER OF VACANT FACILITIES | | | NUMBER OF WAITING VEHICLES | |
|---|---|---|---|---|---|
| | 3 | 2 | 1 | SMALL | LARGE |
| FIRST COUPON | 200JPY | 400JPY | 600JPY | 800JPY | 1000JPY |
| SECOND COUPON | 100JPY | 200JPY | 300JPY | 400JPY | 500JPY |

FIG.8

| CHARGING PARAMETER | THRESHOLD VALUE | PRIORITY | CONTENT TO BE NOTIFIED |
|---|---|---|---|
| SOC DURING CHARGING | X2 | LOW | "CHARGING WILL BE COMPLETED SOON" |
| FEE FOR CHARGING | X3 | HIGH | "PLEASE STOP CHARGING" |

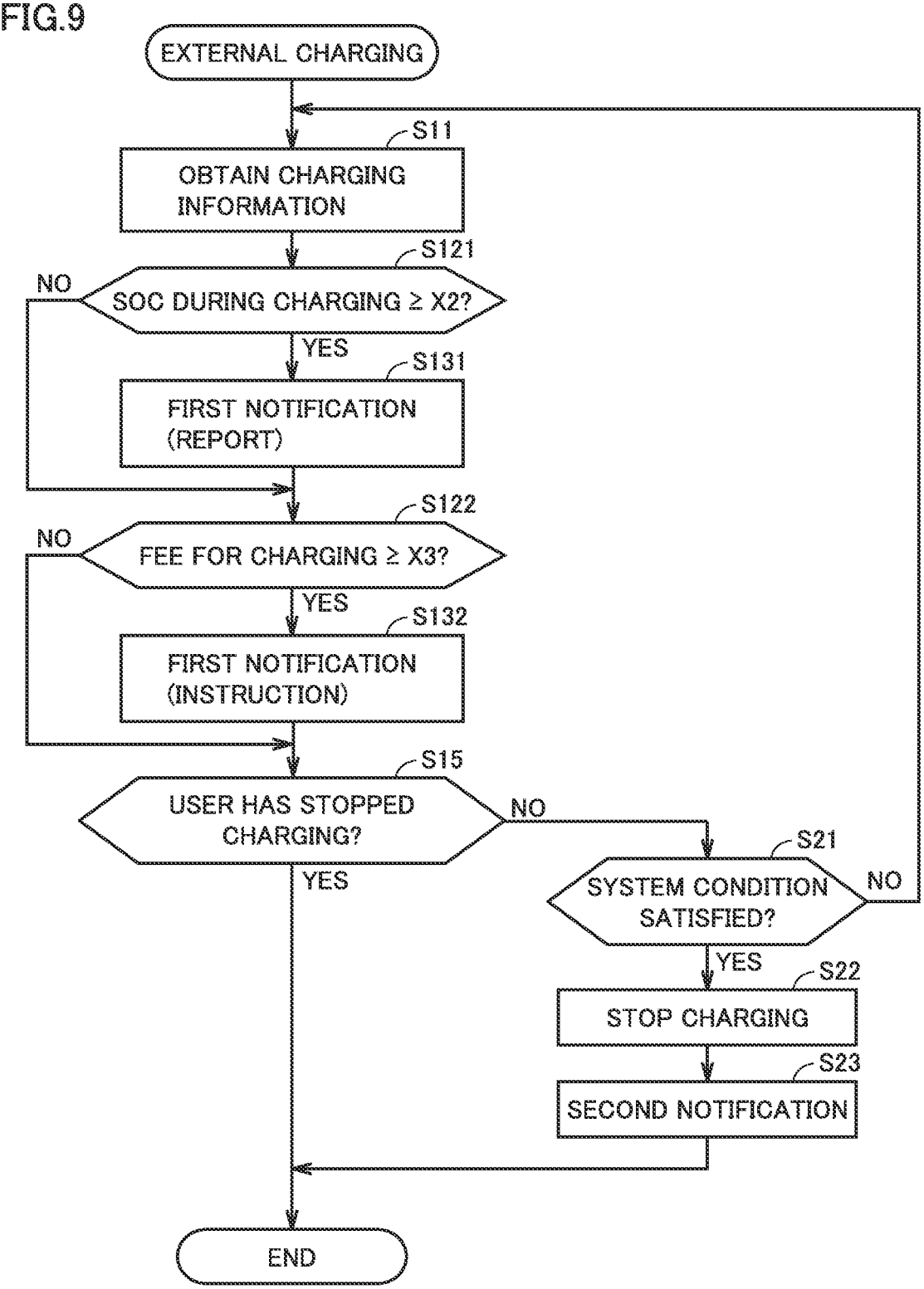

CHARGING SYSTEM

This nonprovisional application is based on Japanese Patent Application No. 2018-240109 filed on Dec. 21, 2018 with the Japan Patent Office, the entire contents of which are hereby incorporated by reference.

BACKGROUND

Field

The present disclosure relates to a charging system, particularly, a charging system including a power supply facility that supplies power to a vehicle.

Description of the Background Art

Japanese Patent Laying-Open No. 2012-244785 discloses a charging system including notification means for transmitting an e-mail to a mobile terminal of a user who uses an installation having a parking area. When a certain period of time has passed since a charging start time with an onboard battery of an electric vehicle being charged using a power supply facility provided in the parking area, this notification means transmits the e-mail to the mobile terminal of the user.

SUMMARY

In the charging system described in Japanese Patent Laying-Open No. 2012-244785, when a predetermined condition (hereinafter, also referred to as "notification condition") is satisfied, the notification means notifies the user through the mobile terminal (for example, notification by way of the e-mail). The notification condition is set to be satisfied when the certain period of time has passed since the charging start time. The notification condition is set in this way in order to control the user to stay in the installation for a long time (see paragraph [0014] of Japanese Patent Laying-Open No. 2012-244785). That is, the notification condition is set for the convenience of a system administrator, rather than the user.

When the user stays in the installation for a long time, the user is more likely to utilize merchandise items and services offered by the installation. On the other hand, however, while the user is using the power supply facility, other users cannot use the power supply facility. When power supply facilities in the parking area have been used for a long time, the number of users per unit time for each power supply facility (hereinafter, also referred to as "user turnover rate") is decreased, with the result that the number of power supply facilities in a state (hereinafter, also referred to as "vacant state") in which the power supply facilities are used by no one may become insufficient.

It is also considered that the system administrator changes the notification condition to provide a notification to the user at an early stage so as to urge the user to stop using the power supply facility. However, even when such a notification is provided to the user, the user may ignore the notification or may not notice the notification. It is also considered to provide such a notification to the user frequently; however, the user's convenience may be impeded by frequently providing such a notification.

The present disclosure has been made to solve the above-described problem, and has an object to provide a charging system that can increase a user turnover rate of a power supply facility and that can improve user's convenience.

A charging system according to the present disclosure includes a vehicle, a power supply facility, a mobile terminal, and a server. The vehicle includes a power storage device chargeable using power supplied from outside of the vehicle. Hereinafter, the charging that supplies a power storage device included in a vehicle with power supplied from outside of the vehicle will be referred to as "external charging". The power supply facility performs the external charging by supplying the power to the vehicle. The mobile terminal receives an input from a user (hereinafter, also referred to as "user input") of the vehicle and provides a notification to the user. The server communicates with the mobile terminal. The mobile terminal sets a first notification condition in the server in response to the user input. A second notification condition is set in the server. The server determines whether or not each of the first notification condition and the second notification condition is satisfied during the external charging. When the first notification condition is satisfied, the server provides a first notification to the user through the mobile terminal. When the second notification condition is satisfied, the server provides a second notification to the user through the mobile terminal.

In the above-described charging system, since the second notification condition is set in the server in advance, the second notification can be provided to the user at the predetermined timing (i.e., timing at which the second notification condition is satisfied). The second notification condition is set in the server in advance by the system administrator, for example. With such a second notification, the user is urged to stop using the power supply facility. Thus, by providing the second notification to the user when the second notification condition is satisfied, the user turnover rate of the power supply facility can be increased.

Further, in the above-described charging system, the user can set the first notification condition in the server through the mobile terminal. When the first notification condition set by the user himself/herself is satisfied, the first notification is provided to the user. The user can receive the first notification at an appropriate timing. With such a scheme, the user's convenience can be improved. Moreover, since the first notification is sent at the timing (i.e., timing at which the first notification condition is satisfied) set by the user himself/herself, the user is more likely to notice the first notification, with the result that the user is less likely to ignore the first notification. With the first notification, the user can be urged to stop using the power supply facility. Hence, by providing the first notification to the user when the first notification condition is satisfied, the user turnover rate of the power supply facility can be increased.

In the above-described charging system, the power supply facility may stop the external charging in response to a predetermined user operation (hereinafter, also referred to as "stopping operation"). When the second notification condition is satisfied during the external charging, the power supply facility may stop the external charging without the stopping operation.

In the above-described charging system, with the first notification, the user is urged to perform the stopping operation. Moreover, with the second notification, the user can be notified that the external charging has been stopped. With such first notification and second notification, the user is urged to bring the power supply facility into an available state (vacant state), whereby the user turnover rate of the power supply facility can be increased.

The second notification condition may be set in advance not only in the server but also in the power supply facility. Moreover, the power supply facility may determine whether or not the second notification condition is satisfied during the external charging, and may stop the external charging when the second notification condition is satisfied. Moreover, during the external charging, the power supply facility may receive, from the server, the result (determination result) as to whether or not the second notification condition is satisfied, and may stop the external charging when the second notification condition is satisfied.

In the above-described charging system, the first notification condition may be set using a plurality of types of parameters (hereinafter, also referred to as "charging parameters") about the external charging. The mobile terminal may set, in the server, a priority of each of the plurality of types of parameters in response to the user input. The server may determine a content to be notified by the first notification, using a value and the priority of each of the plurality of types of parameters.

According to the above-described configuration, the first notification suitable for the user's desire can be provided, with the result that the user's convenience can be improved more. Examples of the above-described charging parameters employed herein may include two or more types of parameters selected from a group consisting of (i) an SOC (State Of Charge) of the power storage device during the external charging (hereinafter, also referred to as "SOC during charging), (ii) a time having passed since start of the external charging (hereinafter, also referred to as "facility usage time"), (iii) an amount of integrated power supplied to the power storage device through the external charging since the start of the charging (hereinafter, also referred to as "amount of charged power"), and (iv) a charging fee billed for the external charging (hereinafter, also referred to as "fee for charging").

The first notification condition is preferably set using at least one of the SOC during charging, the facility usage time, the amount of charged power, and the fee for charging. There is such a tendency that many users wish to receive the first notification at a timing at which the value of each of these parameters becomes more than a predetermined threshold value during the external charging. In order to improve the user's convenience, it is effective to set the first notification condition using these parameters.

On the other hand, the second notification condition is preferably set using at least one of the SOC during charging and the facility usage time. One of main reasons why the user turnover rate of the power supply facility is decreased is that a user exclusively uses the power supply facility for a long time. Such exclusive use is frequently done by continuing to use the power supply facility even though the external charging has been completed. By setting the second notification condition using at least one of the SOC during charging and the facility usage time, the user is urged to stop using the power supply facility at an appropriate timing, with the result that the user turnover rate of the power supply facility can be increased.

In the above-described charging system, after providing the first notification, the server may determine whether or not the user is present within a first range around the vehicle. When it is determined that the user is present within the first range during a first period until passage of a predetermined time from the first notification, the server may issue a first coupon to the user through the mobile terminal, the first coupon being usable at a shop located around the power supply facility.

It is considered that after starting the external charging using the power supply facility, the user moves away temporarily from the vehicle. When such a user returns to the surroundings of the vehicle (within the first range), it can be presumed that the user has an intention (that is, an intention to stop using the power supply facility) to move the vehicle. In the above-described charging system, by issuing a first coupon when the user is determined to be present within the first range during the first period, the user is motivated to stop using the power supply facility immediately.

In the above-described charging system, a plurality of the power supply facilities may be installed in a predetermined region around the shop. The server may determine a usage value of the first coupon, using at least one of (i) a number of available power supply facilities in a vacant state among the power supply facilities in the predetermined region around the shop and (ii) a number of vehicles waiting for the power supply facilities in the predetermined region around the shop to be brought into the vacant state.

A small number of power supply facilities in the vacant state in the predetermined region around the shop means that a demand for power supply facilities is high. Also, a large number of vehicles waiting for a currently used power supply facility to be available means that a demand for power supply facilities is high. Meanwhile, as the usage value (for example, monetary value) of the first coupon issued when the user stops using the power supply facility is increased, the user is more motivated to stop using the power supply facility. In the above-described charging system, a demand-and-supply balance can be adjusted by way of the usage value of the first coupon. It should be noted that increasing the usage value of the issued coupon includes: increasing a usage monetary amount of the coupon or increasing the number of coupons; and increasing a rank for a service set in the coupon.

In the above-described charging system, after providing the second notification, the server may determine whether or not the user is present within a second range around the vehicle. When it is determined that the user is present within the second range during a second period until passage of a predetermined time from the second notification, the server may issue a second coupon to the user through the mobile terminal, the second coupon being usable at the shop. A usage value of the first coupon may be higher than a usage value of the second coupon.

As described above, by issuing the coupon not only after the first notification but also after the second notification, the user can be motivated to stop using the power supply facility immediately after the second notification. Further, in the above-described charging system, the usage value of the coupon issued after the first notification is higher than the usage value of the coupon issued after the second notification. The timing of the second notification tends to be set to a timing after the first notification in consideration of the user's convenience. The first notification is highly likely to be performed at a timing earlier than the timing of the second notification. By increasing the usage value of the coupon issued after the first notification as described above, the user is urged to return to the location of the vehicle immediately (that is, stop using the power supply facility) in response to the first notification. By giving such an incentive to the user to stop using the power supply facility immediately, the user turnover rate of the power supply facility can be increased.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 shows an exemplary coupon having a usage value determined using the number of vacant facilities and the number of waiting vehicles.

FIG. 8 illustrates a charging system according to a modification.

FIG. 9 is a flowchart for illustrating a procedure of the external charging control performed by the server of the charging system according to the modification.

DESCRIPTION OF THE PREFERRED EMBODIMENTS

Figure 1:
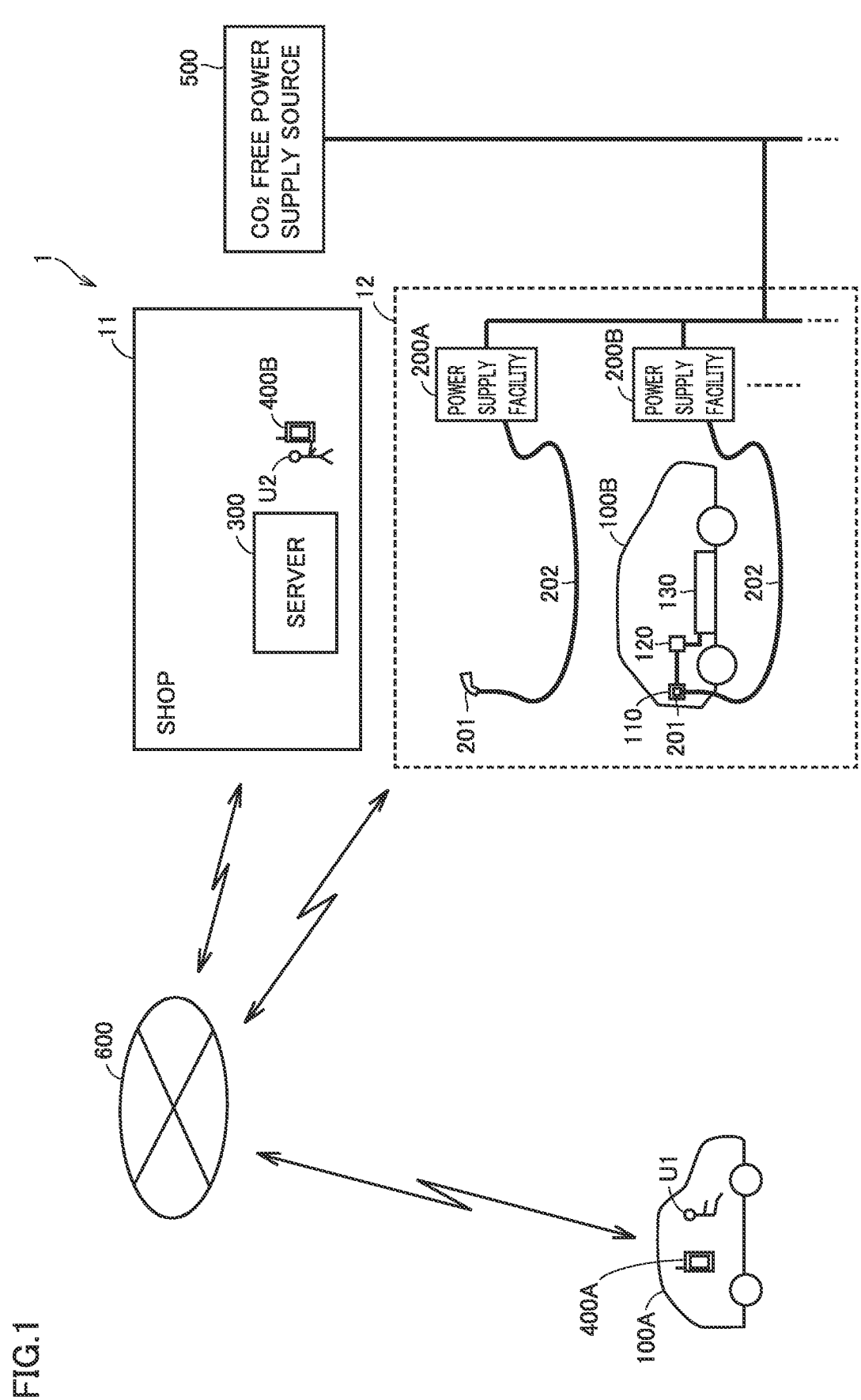
FIG. 1 schematically shows an entire configuration of a charging system according to an embodiment of the present disclosure.

The following describes embodiments of the present disclosure with reference to figures in detail. The same or corresponding portions in the figures are given the same reference characters and are not described repeatedly.

FIG. 1 schematically shows an entire configuration of a charging system according to the present embodiment. This charging system includes an installation 1, vehicles 100A, 100B, user terminals 400A, 400B, a $CO_2$ free power supply source 500, and a communication network 600. Installation 1 includes power supply facilities 200A, 200B. It should be noted that the basic configuration of vehicle 100A is the same as the basic configuration of vehicle 100B. The basic configuration of power supply facility 200A is the same as the basic configuration of power supply facility 200B. The basic configuration of user terminal 400A is the same as the basic configuration of user terminal 400B. Therefore, in the description below, vehicle 100A and vehicle 100B may be described also as "vehicle 100" without distinguishing vehicle 100A and vehicle 100B from each other, power supply facility 200A and power supply facility 200B may be described also as "power supply facility 200" without distinguishing power supply facility 200A and power supply facility 200B from each other, and user terminal 400A and user terminal 400B may be described also as "user terminal 400" without distinguishing user terminal 400A and user terminal 400B from each other, unless they are described in a distinguished manner.

Installation 1 includes a shop 11 and a parking area 12 adjacent to shop 11. That is, shop 11 and parking area 12 are provided in the site of installation 1. In the present embodiment, installation 1 is a shopping center; however, installation 1 may be a different installation (for example, a restaurant). Installation 1 may be a composite installation including a plurality of shops 11, or an installation including only one shop 11.

Shop 11 includes a server 300. In parking area 12, a plurality of power supply facilities 200 including power supply facilities 200A and 200B are installed. Each power supply facility 200 in parking area 12 is assigned information (hereinafter, also referred to as "power supply facility ID") for specifying power supply facility 200. The charging system shown in FIG. 1 includes the plurality of power supply facilities 200. However, any number of power supply facilities 200 may be provided. One power supply facility 200 may be provided. In the present embodiment, as an example, three power supply facilities 200 (only power supply facilities 200A, 200B are shown) are provided. Parking area 12 according to the present embodiment corresponds to one example of the "predetermined region around the shop" according to the present disclosure.

Each of power supply facilities 200 in parking area 12 is connected to $CO_2$ free power supply source 500. $CO_2$ free power supply source 500 supplies power supply facility 200 with power generated using renewable energy. Renewable energy is energy (such as solar energy, wind power energy, geothermal energy, and biomass energy) that is not exhausted, that can be used repeatedly, and that involves low environmental impact. Hereinafter, the power generated using renewable energy will be also referred to as "$CO_2$ free power". It should be noted that $CO_2$ free power supply source 500 may be a power generation device itself that generates $CO_2$ free power, or may be a device that is operated by an electric power company and that aggregates and manages $CO_2$ free power generated by a plurality of power generation stations, for example. Moreover, the $CO_2$ free power may be power obtained by adding an environmental value to fossil-derived power by way of J-Credit or Non-Fossil Fuel Energy Certificate.

Power supply facility 200 includes a charging cable 202 having a connector 201 at its tip, and can supply the $CO_2$ free power to vehicle 100 via charging cable 202. Vehicle 100 is an electrically powered vehicle including an inlet 110, a power conversion device 120, and a power storage device 130. Examples of such an electrically powered vehicle includes: a plug-in hybrid vehicle; and an electric vehicle having no engine mounted thereon. Vehicle 100A is being driven by a user U1 to travel toward parking area 12 of installation 1. Vehicle 100B is parked near power supply facility 200B, and is being supplied with $CO_2$ free power from power supply facility 200B.

Power storage device 130 stores power for electrically powered traveling, and can be externally charged using power supplied from outside of the vehicle. Examples of power storage device 130 employed herein include: a secondary battery such as a lithium ion battery or a nickel-metal hydride battery; and a large-capacity capacitor. Power storage device 130 of vehicle 100B is being charged (externally charged) using power supplied from power supply facility 200B. Connector 201 of charging cable 202 is connected to inlet 110 of vehicle 100B. Charging cable 202 includes a signal line and a power line therein. By connecting, to inlet 110, connector 201 of charging cable 202 connected to power supply facility 200B, power can be supplied from power supply facility 200B to vehicle 100B via charging cable 202. Moreover, vehicle 100B and power supply facility 200B are communicatively connected to each other via charging cable 202. Power received by vehicle 100B via inlet 110 is supplied to power storage device 130 via power conversion device 120. Power conversion device 120 converts AC power supplied from power supply facility 200B into DC power.

Users U1, U2 are owners of vehicles 100A, 100B, respectively. As described above, power supply facility 200B is being used by user U2. Hence, other users cannot use power supply facility 200B. On the other hand, power supply facility 200A is used by no one, and is therefore in a vacant state in which power supply facility 200A can be used.

User U1 is driving vehicle 100A. After starting to externally charge vehicle 100B using power supply facility 200B, user U2 is doing shopping at shop 11 during a waiting time for the charging. User terminals 400A, 400B are carried by users U1, U2, respectively. The charging system according to the present embodiment includes a plurality of user terminals 400 including user terminals 400A, 400B. In the present embodiment, a smartphone is employed as user terminal 400; however, a different mobile terminal (for example, a wearable device such as a smartwatch) can be employed. User terminal 400 according to the present embodiment corresponds to an example of the "mobile terminal" according to the present disclosure.

A system administrator issues, to user terminal 400 permitted to use the charging system (for example, a terminal of a user having been through a registration procedure or a terminal of a user having made a contract), information for specifying user terminal 400. Hereinafter, the information for specifying user terminal 400 will be also referred to as "user ID". The user ID is provided for each user terminal 400. In user terminal 400 provided with the user ID, application software (hereinafter, simply referred to as "application") for using the charging system is installed. Through the application, server 300 can present predetermined information (for example, a message) on the screen of user terminal 400 or can issue a coupon to user terminal 400. Moreover, user terminal 400 can transmit predetermined information to server 300 through the application. The user ID is used for information management, for example. For example, server 300 may manage information for specifying the vehicle owned by each user (hereinafter, also referred to as "vehicle ID"), in association with the user ID.

The coupon issued from server 300 to user terminal 400 is a coupon usable at shop 11. For example, by showing the coupon to a salesclerk of shop 11, a service (for example, a discount service for a predetermined monetary amount, or provision of food or drink) set in the coupon can be received. In the present embodiment, a coupon in which such a discount service is set (hereinafter, also referred to as "discount coupon") is employed. A discount monetary amount is set for each discount coupon.

Server 300 can communicate with vehicle 100, power supply facility 200 and user terminal 400. Vehicle 100, power supply facility 200, server 300, and user terminal 400 can access a communication network 600 and can communicate with one another via communication network 600. For communication network 600, any communication network can be employed. Communication network 600 may be the Internet. For example, each of vehicle 100 and user terminal 400 performs wireless communication to access communication network 600, and each of power supply facility 200 and server 300 are communicatively connected to communication network 600 wiredly. However, the configuration is not limited thereto. Power supply facility 200 and server 300 may also perform wireless communication to access communication network 600.

With reference to FIG. 2 to FIG. 5, the following sequentially describes respective configurations of vehicle 100, power supply facility 200, server 300, and user terminal 400.

Figure 2:
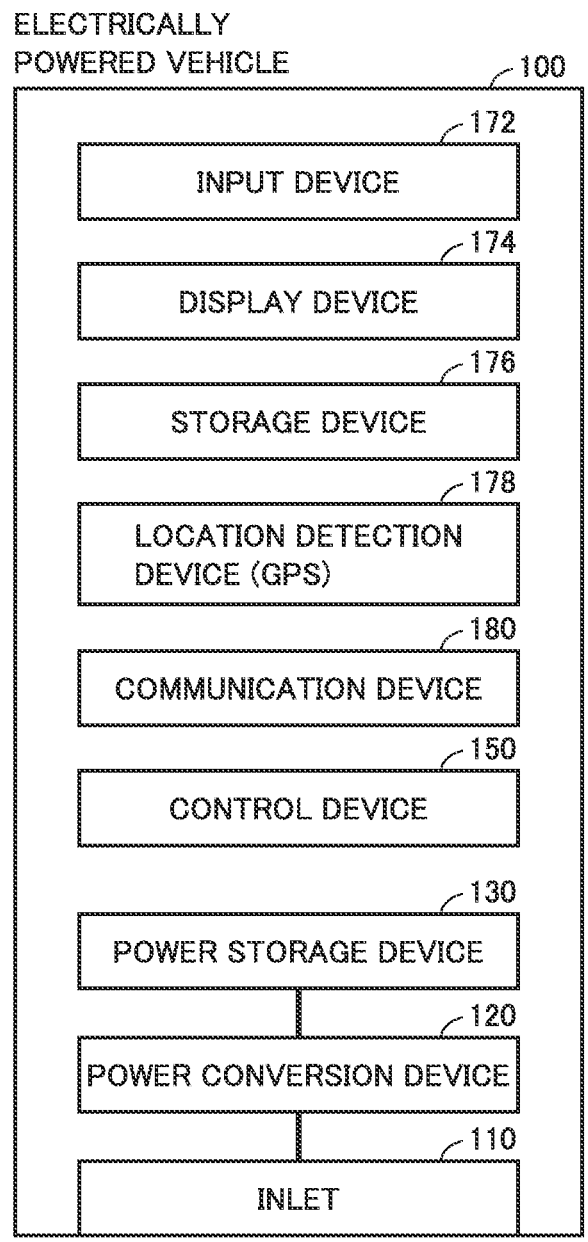
FIG. 2 schematically shows an exemplary configuration of a vehicle in the charging system shown in FIG. 1.

FIG. 2 schematically shows an exemplary configuration of vehicle 100. In addition to inlet 110, power conversion device 120, and power storage device 130 described above, vehicle 100 includes a control device 150, an input device 172, a display device 174, a storage device 176, a location detection device 178, and a communication device 180.

Control device 150 is configured to include a CPU (Central Processing Unit), and performs control for each device of vehicle 100.

Although not shown in the figures, power storage device 130 includes: a charging relay (not shown) that is controlled to become ON/OFF by control device 150; a SMR (system main relay) (not shown) that is controlled to become ON/OFF by control device 150; and a monitoring unit (not shown) that monitors a state of power storage device 130. The monitoring unit includes various types of sensors to detect states (for example, temperature, current, and voltage) of power storage device 130, and outputs detection results to control device 150. The charging relay is brought into an ON state (conductive state) when performing external charging using power supply facility 200. The SMR is disposed in a power supply path from power storage device 130 to a traveling driving device (not shown) of vehicle 100, and is in the ON state (conductive state) during the traveling using power of power storage device 130. Control device 150 obtains states (for example, temperature, current, voltage, and SOC) of power storage device 130 based on outputs (detection values of the various types of sensors) of the monitoring unit. The SOC is defined by a ratio (for example, a percentage) of an amount of stored power at present to a full charge capacity.

Input device 172 is constituted of, for example, a touch panel and a switch, and receives an operation (user operation) by the user. Input device 172 outputs, to control device 150, a signal corresponding to the user operation.

Display device 174 is constituted of, for example, a liquid crystal panel, and presents, to the user, various types of information in accordance with instructions from control device 150.

In addition to the vehicle ID, various types of programs, and various types of parameters used by the programs, storage device 176 stores various pieces of information such as information input into input device 172 and information received from outside by communication device 180.

Location detection device 178 uses GPS (Global Positioning System) to detect information (hereinafter, also referred to as "vehicle location information") indicating a current location (longitude and latitude) of vehicle 100.

Communication device 180 is an interface for communicating with power supply facility 200, server 300, and user terminal 400 via communication network 600.

Figure 3:
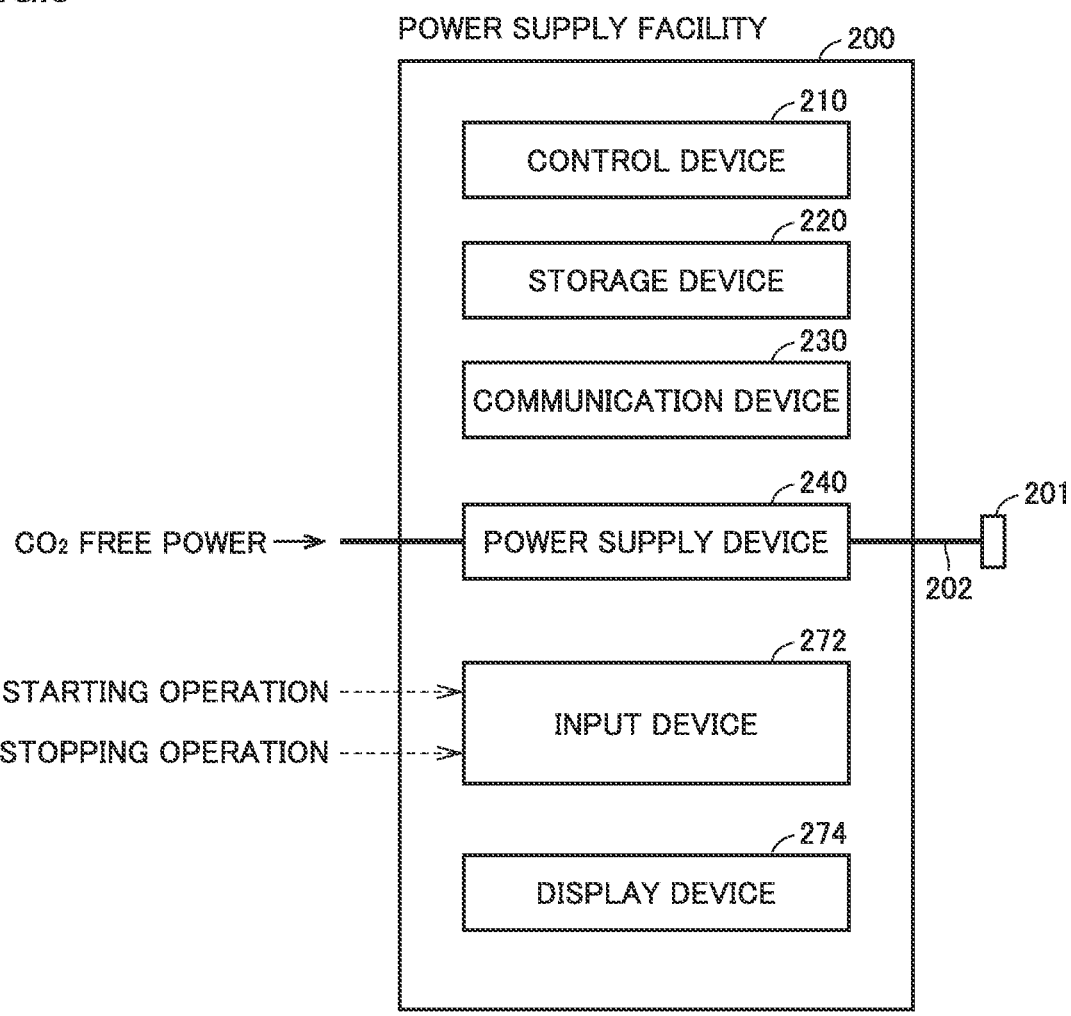
FIG. 3 schematically shows an exemplary configuration of a power supply facility in the charging system shown in FIG. 1.

FIG. 3 schematically shows an exemplary configuration of power supply facility 200. Power supply facility 200 includes a control device 210, a storage device 220, a communication device 230, a power supply device 240, an input device 272, and a display device 274.

Control device 210 is configured to include a CPU (Central Processing Unit), and performs control for each device of power supply facility 200. In addition to the power supply facility ID, various types of programs, and various types of parameters used by the programs, storage device 220 stores various pieces of information such as: information obtained from outside through input device 272 or communication device 230; and history information of the $CO_2$ free power supplied by power supply device 240 to vehicle 100. Communication device 230 is an interface for communicating with vehicle 100, server 300, and user terminal 400 via communication network 600, for example.

Power supply device 240 is a device for supplying $CO_2$ free power to vehicle 100 via charging cable 202. Power supply device 240 is controlled by control device 210.

Input device 272 is constituted of, for example, a touch panel and a switch, and receives an operation (user operation) by the user. Input device 272 outputs, to control device 210, a signal corresponding to the user operation. Moreover, input device 272 may have a function to read information stored in a charging card (for example, an IC card or a magnetic card). The information read by input device 272 is output to control device 210 and storage device 220.

Display device 274 is constituted of, for example, a liquid crystal panel, and presents, to the user, various types of information in accordance with instructions from control device 210.

Power supply facility 200 bills a usage-based fee. As the charging time becomes longer, the charging fee becomes higher.

Power supply facility 200 starts supply of power in response to a predetermined user operation (starting operation), and stops ongoing supply of power in response to a predetermined user operation (stopping operation). The stopping operation is performed onto input device 272. Based on a signal from input device 272, control device 210 determines whether or not the stopping operation has been performed by the user. When the stopping operation is performed, control device 210 transmits a stopping signal to server 300 so as to notify stopping of the external charging, and controls power supply device 240 to stop the supply of power.

Figure 4:
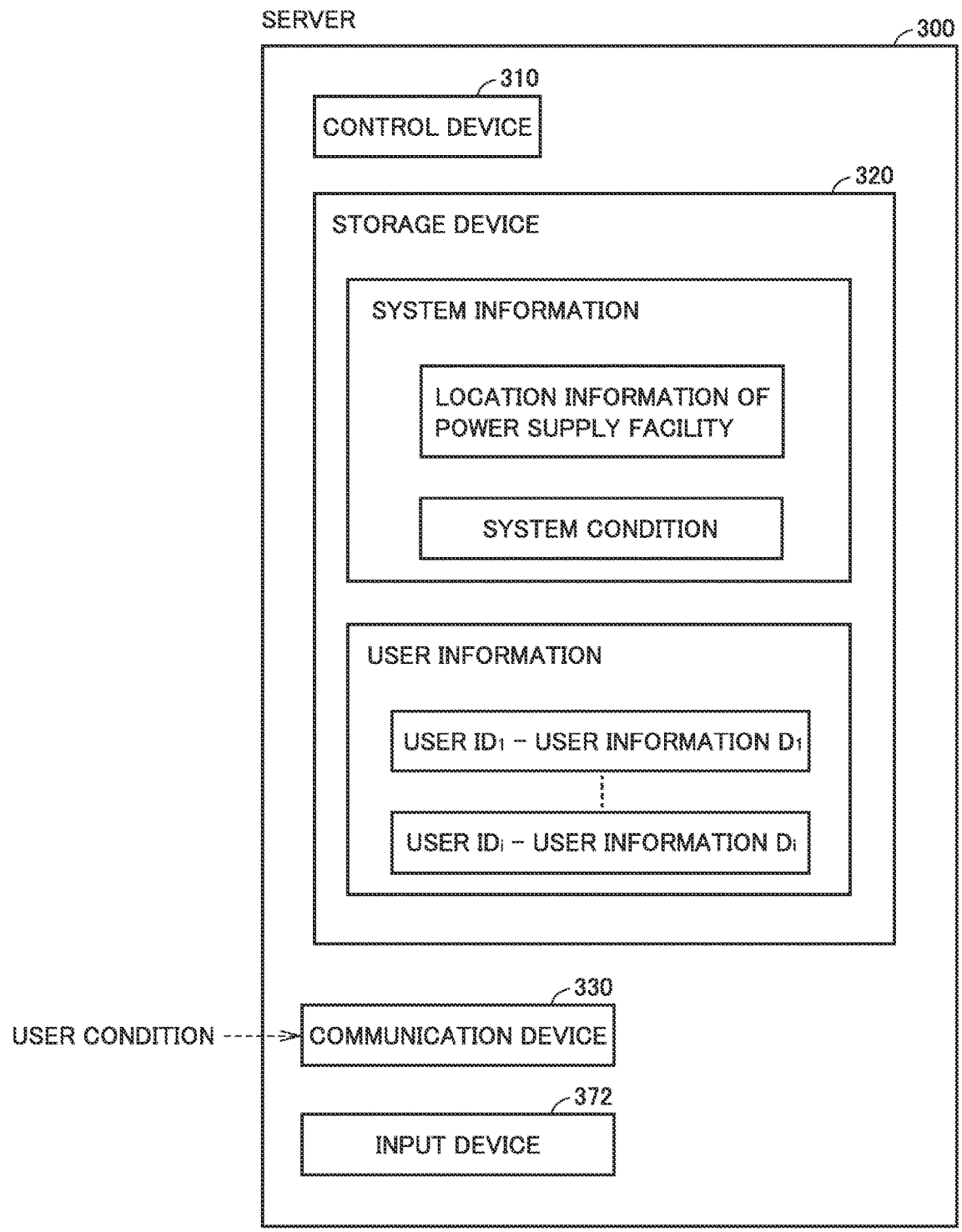
FIG. 4 schematically shows an exemplary configuration of a server in the charging system shown in FIG. 1.

FIG. 4 schematically shows an exemplary configuration of server 300. Server 300 includes a control device 310, a storage device 320, a communication device 330, and an input device 372.

Control device 310 is configured to include a CPU (Central Processing Unit), and performs control for each device of server 300. In the present embodiment, control device 310 has a timer function. Such a timer function can be realized by software or hardware. For example, a timer function by software can be realized by control device 310 executing a program that increments a counter (variable) prepared in storage device 320 whenever a control cycle has passed since a timer start, and that determines whether or not the counter value has reached a predetermined value (i.e., whether or not a predetermined time has passed since the timer start).

In addition to various types of programs and various types of parameters used by the programs, storage device 320 stores: predetermined system information (for example, location information of each power supply facility 200, and a below-described system condition); and below-described predetermined user information. The location information of the power supply facility stored in storage device 320 includes a second range used in a below-described process of FIG. 6. The second range is set for each power supply facility 200. In storage device 320, server 300 manages the location information of each power supply facility 200 in association with its power supply facility ID. Control device 310 can store, into storage device 320, information obtained from outside through communication device 330 or input device 372. In storage device 320, information of each user (user information $D_1$ to user information $D_i$) is managed in association with a corresponding user ID (user $ID_1$ to user $ID_i$). Each of user information $D_1$ to user information $D_i$ includes a below-described user condition, for example. Further, the vehicle ID described above may be included in corresponding one of user information $D_1$ to user information $D_i$.

Communication device 330 is an interface for communicating with vehicle 100, power supply facility 200, and user terminal 400 via communication network 600, for example.

Input device 372 is constituted of, for example, a touch panel and a switch, and receives an operation (user operation) by the user.

Figure 5:
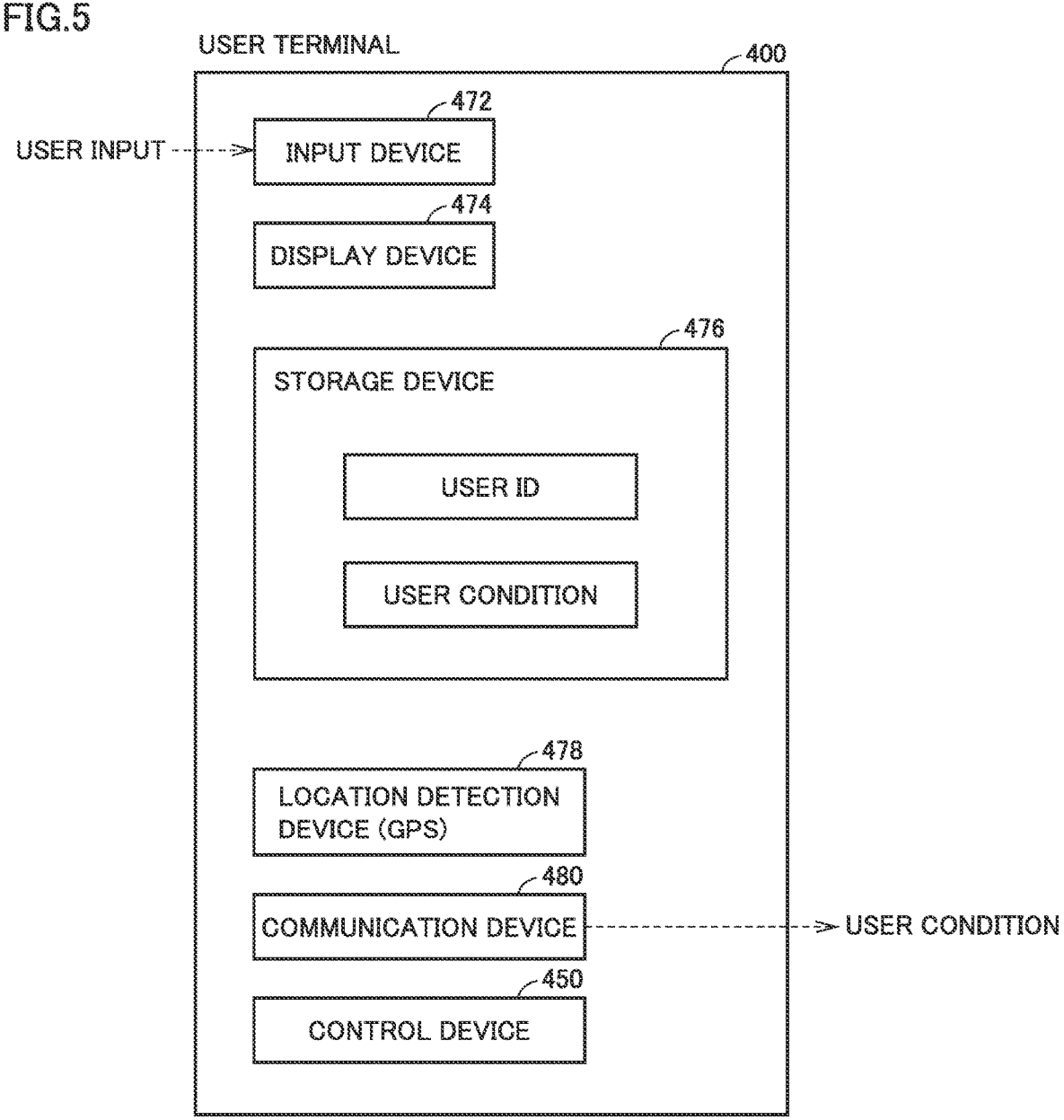
FIG. 5 schematically shows an exemplary configuration of a user terminal in the charging system shown in FIG. 1.

FIG. 5 schematically shows an exemplary configuration of user terminal 400. User terminal 400 includes a control device 450, an input device 472, a display device 474, a storage device 476, a location detection device 478, and a communication device 480.

Control device 450 is configured to include a CPU (Central Processing Unit), and performs control for each device of user terminal 400.

Input device 472 is constituted of, for example, a touch panel and a switch, and receives an operation (user operation) by the user. Input device 472 outputs, to control device 450, a signal corresponding to the user operation.

Display device 474 is constituted of, for example, a liquid crystal panel, and presents, to the user, various types of information in accordance with instructions from control device 450.

In addition to various types of programs and various types of parameters used by the programs, storage device 476 stores user information (for example, the user ID and the user condition described later) about the owner of user terminal 400. Further, control device 450 can store, into storage device 476, information obtained from outside through communication device 480 or input device 472.

Location detection device 478 uses GPS (Global Positioning System) to detect information indicating a current location (longitude and latitude) of user terminal 400. Hereinafter, the information indicating the current location of user terminal 400 will be also referred to as "user location information".

Communication device 480 is an interface for communicating with vehicle 100, power supply facility 200, and server 300 via communication network 600, for example.

When each power supply facility 200 in parking area 12 is used for a long time, the user turnover rate (i.e., the number of users per unit time for each power supply facility 200) is decreased, with the result that the number of power supply facilities in the vacant state may become insufficient. Moreover, each of power supply facilities 200 in parking area 12 is a power supply facility (hereinafter, also referred to as "$CO_2$ free power supply facility") that can supply $CO_2$ free power. In recent years, users with a high level of environmental awareness have been increased, with the result that a demand for $CO_2$ free power supply facilities is increasing. However, the wide-spread adoption rate of the $CO_2$ free power supply facilities at present is not high. Hence, it has been required to increase the user turnover rate of the $CO_2$ free power supply facility.

To address this, in the charging system according to the present embodiment, server 300 determines whether or not each of a below-described first notification condition (hereinafter, also referred to as "user condition") and a below-described second notification condition (hereinafter, also referred to as "system condition") is satisfied during external charging, provides the first notification to the user through user terminal 400 when the user condition is satisfied, and provides the second notification to the user through user terminal 400 when the system condition is satisfied. Moreover, during the external charging, each power supply facility 200 in parking area 12 receives, from server 300, a result (determination result) as to whether or not the system condition is satisfied, and stops the external charging when the system condition is satisfied. Power supply facility 200 does not stop the external charging when the user condition is satisfied during the external charging; however, when the system condition is satisfied, power supply facility 200 stops the external charging without the stopping operation. It should be noted that power supply facility 200 may determine, by itself, whether or not the system condition is satisfied during the external charging, and may stop the external charging when the system condition is satisfied.

The user condition can be set in server 300 by the user by way of user terminal 400. User terminal 400 can set the user condition in server 300 by inputting it into input device 472. More specifically, user terminal 400 includes: an input device 472 that receives an input (user input) from the user; and a display device 474 that provides a notification to the user (FIG. 5). For example, in user terminal 400A shown in FIG. 1, input device 472 receives a user input from user U1 of vehicle 100A, and display device 474 provides a notification to user U1. The user can set the user condition in user terminal 400 by operating input device 472.

In the present embodiment, one parameter is selected by the user from options including a plurality of types of parameters in a user condition setting screen (hereinafter, also referred to as "user setting screen") presented on display device 474 of user terminal 400, and a threshold value X1 for the parameter is set by the user. Accordingly, the user condition satisfied when the selected parameter reaches threshold value X1 is set in user terminal 400. In the present embodiment, the above-described options presented on the user setting screen include: an SOC during charging (i.e., an SOC of power storage device 130 during the external charging using power supply facility 200); a facility usage time (i.e., a time having passed since the start of the external charging using power supply facility 200); an amount of charged power (i.e., an amount of integrated power supplied to power storage device 130 by power supply facility 200 since the start of the charging); and a fee for charging (i.e., a charging fee billed for the external charging in power supply facility 200).

It should be noted that in the present embodiment, the number of options is four; however, the number of options can be changed appropriately. Moreover, only one parameter (for example, one of the SOC during charging, the facility usage time, the amount of charged power, and the fee for charging) may be employed, and only threshold value X1 for the parameter may be set by the user.

The user condition set as described above is stored in storage device 476. Moreover, the user condition is transmitted to server 300 by communication device 480 of user terminal 400, and is stored in storage device 320. The user condition set in user terminal 400 are thus set in server 300. In storage device 320, the user condition for each user terminal is managed in association with a corresponding user ID (FIG. 4). Server 300 receives the user ID from user terminal 400 together with the user condition, and adds the user condition to the user information (for example, one of user information $D_1$ to user information $D_i$ shown in FIG. 4) corresponding to the user ID. When the user condition has been already registered, the user condition is updated with the received user condition.

The system condition is set in server 300 in advance. The system administrator can store the system condition in storage device 320 in advance, or can set the system condition in server 300 by operating input device 372. The system condition thus set is stored in storage device 320. In the present embodiment, the following system condition is set in server 300 in advance: a system condition that is satisfied when power storage device 130 (onboard battery) is fully charged during the external charging or when the facility usage time reaches a threshold value Y1 (for example, 1 hour). In addition to server 300, the system condition may be also set in each power supply facility 200 in parking area 12 in advance. The system administrator can also store the system condition in storage device 220 in advance, and can set the system condition in power supply facility 200 by operating input device 272.

In the charging system according to the present embodiment, the second notification can be provided to the user at a predetermined timing (i.e., a timing at which the system condition is satisfied). A content to be notified by the second notification can be set appropriately. For example, the second notification may notify the stopping of the external charging to the user. With such a second notification, the user is urged to stop using the power supply facility. Hence, by providing the second notification to the user when the second notification condition is satisfied, the user turnover rate of the power supply facility can be increased.

Further, in the charging system according to the present embodiment, the user can set the user condition in server 300 through user terminal 400. When the user condition set by the user himself/herself is satisfied, the first notification is provided to the user. The user can receive the first notification at an appropriate timing. The user can decide a timing to end the external charging in consideration of the first notification, for example. Moreover, the first notification may urge the user to stop using the power supply facility (for example, urge the user to perform the stopping operation onto the power supply facility). By providing the first notification to the user when the user condition is satisfied, the user turnover rate of the power supply facility can be increased.

Figure 6:
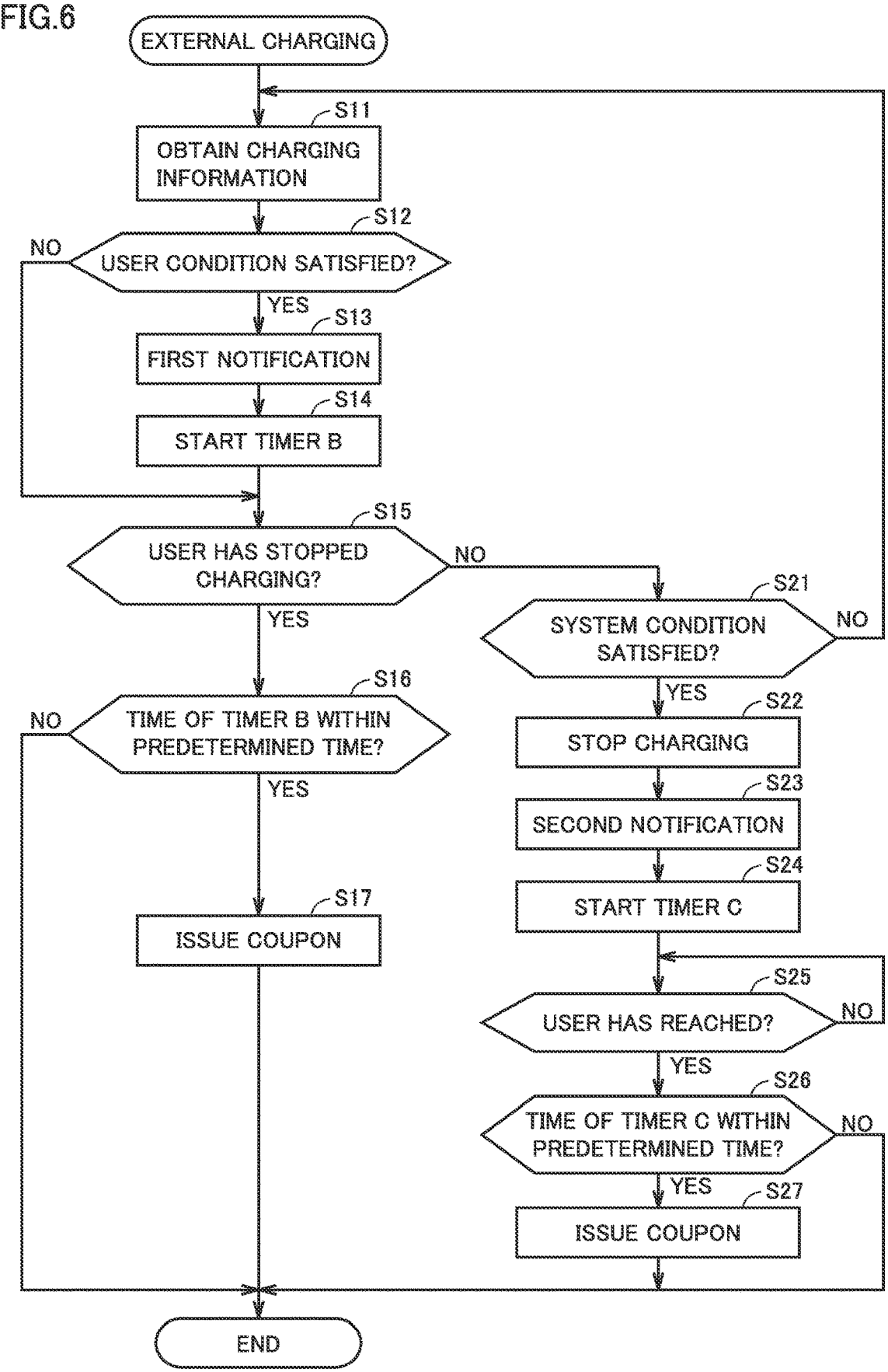
FIG. 6 is a flowchart for illustrating a procedure of external charging control performed by the server of the charging system according to the embodiment of the present disclosure.

FIG. 6 is a flowchart for illustrating a procedure of external charging control performed by server 300 of the charging system according to the present embodiment. The process shown in this flowchart is started at a timing at which power supply facility 200 starts external charging, for example. In server 300, external charging control is performed by executing, by a processor (for example, a CPU) included in control device 310, a program stored in storage device 320. It should be noted that various types of control are not limited to a process by software, and can be a process by dedicated hardware (electronic circuit).

Prior to the external charging, the user of vehicle 100 sets the user condition in user terminal 400 (that is, in server 300). For example, the user selects the fee for charging in the above-described user setting screen, and then sets threshold value X1 (for example, 300 JPY) for the fee for charging. After setting the user condition, the user brings vehicle 100 into a chargeable state and performs a predetermined user operation (starting operation) onto input device 272. Accordingly, power supply facility 200 starts external charging. For example, the user can bring vehicle 100 into the chargeable state in the following manner: the user parks vehicle 100 near power supply facility 200, then inputs the user ID into power supply facility 200, and connects, to inlet 110 of vehicle 100, connector 201 of charging cable 202 connected to power supply facility 200. When the above-described starting operation is performed, power supply facility 200 transmits, to server 300, its power supply facility ID, the user ID input by the user of vehicle 100, and a starting signal that notifies the start of the external charging, and starts supply of power (that is, external charging) to vehicle 100. When the starting signal is received, server 300 starts a timer (hereinafter, also referred to as "timer A") for measuring the facility usage time, and performs a below-described process illustrated in FIG. 6.

It should be noted that the user ID may be input into power supply facility 200 in any manner. For example, the user ID stored in the charging card may be read by input device 272 of power supply facility 200. An image (for example, a bar code or a two-dimensional code) indicating the user ID may be presented on user terminal 400, and the presented image (that is, the user ID) may be read by input device 272 of power supply facility 200. The user ID may be input into power supply facility 200 by way of a key operation onto input device 272.

With reference to FIG. 6, in a step (hereinafter, also abbreviated as "S") 11, server 300 obtains information (hereinafter, also referred to as "charging information") about the outgoing external charging. The charging information obtained in S11 include: a value of a charging parameter used in the user condition (in the present embodiment, the value of the fee for charging); and a value of a charging parameter used in the system condition (in the present embodiment, the value of the SOC during charging). Server 300 can obtain the value of the fee for charging from power supply facility 200. Server 300 can obtain the value of the SOC during charging from vehicle 100. It should be noted that communication between server 300 and vehicle 100 may be performed directly through wireless communication, or may be performed via power supply facility 200.

In S12, server 300 determines whether or not the user condition is satisfied. As described above, the user condition is set in server 300 by the user before starting the charging. When the value of the fee for charging obtained in S11 has not reached threshold value X1, NO is determined in S12 and the process proceeds to S15. On the other hand, when the value of the fee for charging obtained in S11 has reached threshold value X1, YES is determined in S12. In this case, the process proceeds to S15 via S13 and S14.

In S15, server 300 determines whether or not the external charging has been stopped in response to the stopping operation performed by the user. Performing the stopping operation means that the user is near power supply facility 200 (that is, vehicle 100). Hence, when the external charging is stopped in response to the above-described stopping operation, server 300 determines that the user is present within a first range around vehicle 100. When a stopping signal is received from power supply facility 200, server 300 determines that the external charging has been stopped in response to the above-described stopping operation. When the stopping signal is received from power supply facility 200 (YES in S15), the process proceeds to S16. When the stopping signal is not received from power supply facility 200 (NO in S15), the process proceeds to S21.

In S21, server 300 determines whether or not the system condition set in advance is satisfied. The system condition is satisfied when power storage device 130 of vehicle 100 is fully charged during the external charging or when the value of the facility usage time measured by timer A reaches threshold value Y1 (for example, 1 hour). Server 300 uses the value of the SOC during charging obtained in S11 so as to determine whether or not power storage device 130 is fully charged. When the system condition is satisfied (YES in S21), the process proceeds to S22. When the system condition is not satisfied (NO in S21), the process returns to S11.

It is considered that until passage of a certain amount of time after starting the external charging, NO is determined in all of S12, S15, and S21 and the processes of S11, S12, S15, and S21 are repeated. Then, when the time passes and the value of the fee for charging obtained in S11 reaches threshold value X1, YES is determined in S12 and the process proceeds to S13.

In S13, server 300 provides the first notification to the user of vehicle 100 through user terminal 400. In the present embodiment, server 300 pops up a predetermined message (for example, "CHARGING FEE EXCEEDED 300 JPY") on the screen of user terminal 400 through the application of user terminal 400. User terminal 400 may notify occurrence of the pop-up to the user by way of sound or vibration. In the first notification, the user may be notified that a coupon having a high usage value is to be issued if the use of the power supply facility is stopped immediately. The content to be notified by the first notification may be automatically set by server 300, or may be set by the user in the user setting screen. After providing the first notification, server 300 starts a timer (hereinafter, also referred to as "timer B") for measuring a time having passed since the first notification in S14.

When the stopping operation is performed by the user after the process of S14, YES is determined in S15. For example, when user U2 in shop 11 shown in FIG. 1 receives the first notification, returns to the location of vehicle 100B, and performs the stopping operation onto input device 272 of power supply facility 200B, YES is determined in S15 and the process proceeds to S16.

In S16, server 300 determines whether or not a time (hereinafter, also referred to as "first response time") from the provision of the first notification until the stopping operation is performed by the user is less than or equal to a predetermined time (hereinafter, also referred to as "ΔT1"). Server 300 can obtain the first response time using a count value (measurement time) of timer B. ΔT1 can be set appropriately, and may be 30 minutes, for example. In the present embodiment, the period from the first notification until passage of ΔT1 corresponds to an example of the "first period" according to the present disclosure.

When the first response time is less than or equal to ΔT1 (YES in S16), in S17, server 300 issues a coupon (for example, a discount coupon) to user terminal 400, and then ends the series of processes of FIG. 6. On the other hand, when the first response time is more than ΔT1 (NO in S16), server 300 ends the series of processes of FIG. 6 without issuing the coupon. In the present embodiment, the usage value of the coupon issued in S17 is higher than the usage value of the coupon issued in S27 described below. More specifically, in S17, a discount coupon having a discount monetary amount higher than that in S27 is issued. In the present embodiment, the coupon issued in S17 corresponds to an example of the "coupon issued after the first notification" according to the present disclosure, and the coupon issued in S27 corresponds to an example of the "coupon issued after the second notification" according to the present disclosure.

When a time has passed while the user ignores the first notification and does not perform the above-described stopping operation after the process of S14, the value of the facility usage time measured by timer A reaches threshold value Y1, with the result that the system condition is satisfied. Moreover, also when power storage device 130 of vehicle 100 is fully charged before the value of the facility usage time reaches threshold value Y1, the system condition is satisfied. When the system condition is satisfied, YES is determined in S21 and the process proceeds to S22.

In S22, server 300 transmits a stopping instruction to power supply facility 200 to cause power supply facility 200 to stop the supply of power (that is, the external charging).

It should be noted that power supply facility 200 may determine, by itself, whether or not the system condition is satisfied, and may stop the external charging without waiting for the stopping instruction from server 300 when the system condition is satisfied.

After the process of S22, in S23, server 300 provides the second notification to the user of vehicle 100 through user terminal 400. In the present embodiment, server 300 pops up a predetermined message (for example, "PLEASE MOVE THE VEHICLE") on the screen of user terminal 400 through the application of user terminal 400. User terminal 400 may notify the occurrence of the pop-up to the user by way of sound or vibration. Then, in S24, server 300 starts a timer (hereinafter, also referred to as "timer C") for measuring a time having passed since the second notification.

After the process of S24, in S25, server 300 determines whether or not the user is present within a second range around vehicle 100 (i.e., whether the user has reached surroundings of vehicle 100). Server 300 obtains the location information of power supply facility 200 (that is, the second range) using the power supply facility ID obtained when starting the charging. However, the configuration is not limited to this. Server 300 may set the second range around vehicle 100 using the vehicle location information (more specifically, the current location of vehicle 100 detected by location detection device 178), instead of the location information of power supply facility 200. Server 300 can determine whether or not the user is present within the second range, using the location information of user terminal 400 obtained from user terminal 400 (more specifically, the user location information detected by location detection device 478). Server 300 can specify the location of the user by using the user location information. When the user is present within the second range, server 300 may request, through the application of user terminal 400, the user to perform a predetermined operation (hereinafter, also referred to as "usage ending operation"). When the usage ending operation is performed by the user, server 300 may determine that the user is present within the second range. Examples of the usage ending operation include a user operation performed by the user onto a button presented on the screen of user terminal 400 by way of GUI (Graphical User Interface) of user terminal 400.

During a period in which it is determined that the user is not present within the second range (NO) in S25, the process of S25 is repeated. Then, when it is determined that the user is present within the second range (YES) in S25, the process proceeds to S26.

In S26, server 300 determines whether or not a time (hereinafter, also referred to as "second response time") from the provision of the second notification until the user reaches the second range is less than or equal to a predetermined time (hereinafter, also referred to as "ΔT2"). Server 300 can obtain the second response time using a count value (measurement time) of timer C. ΔT2 can be set appropriately, and may be 30 minutes, for example. In the present embodiment, the period from the second notification until passage of ΔT2 corresponds to an example of the "second period" according to the present disclosure.

When the second response time is less than or equal to ΔT2 (YES in S26), in S27, server 300 issues a coupon (for example, a discount coupon) to user terminal 400, and then ends the series of processes of FIG. 6. On the other hand, when the second response time is more than ΔT2 (NO in S26), server 300 ends the series of processes of FIG. 6 without issuing the coupon.

It should be noted that in each of S15 and S25 of FIG. 6, whether or not the user is present around vehicle 100 (within the first range or the second range) is determined in any manner. For example, in S15, server 300 determines whether or not the user is present around vehicle 100 using the user location information obtained from user terminal 400, and may determine YES in S15 when the user is present around vehicle 100. Moreover, in at least one of S15 and S25, when a certain operation is performed onto vehicle 100 (for example, when charging cable 202 connected to vehicle 100 is removed), the server may determine that the user is present around vehicle 100.

As described above, in the charging system according to the present embodiment, the user can set the user condition (first notification condition) in server 300 through user terminal 400. When the user condition set by the user himself/herself is satisfied (YES in S12), the first notification is provided to the user (S13). The user can receive the first notification at an appropriate timing. With such a scheme, the user's convenience can be improved. Moreover, since the first notification is sent at the timing set by the user himself/herself, the user is more likely to notice the first notification, with the result that the user is less likely to ignore the first notification. With the first notification, the user can be urged to stop using power supply facility 200. Hence, by providing the first notification to the user when the user condition is satisfied, the user turnover rate of power supply facility 200 can be increased. Moreover, by providing the second notification to the user (S23) when the system condition is satisfied (YES in S21), the user turnover rate of power supply facility 200 can be increased.

In the charging system according to the above-described embodiment, a coupon is issued (S17, S27 of FIG. 6). By issuing the coupon to the user who has returned to the location of vehicle 100 immediately in response to the first notification or the second notification, an incentive can be given to the user to stop using power supply facility 200 immediately.

In the above-described embodiment, server 300 may determine the usage value of the coupon issued in each of S17 and S27 of FIG. 6, using at least one of: the number of available power supply facilities 200 in the vacant state among the plurality of power supply facilities 200 installed in parking area 12 (hereinafter, also referred to as "the number of vacant facilities"); and the number of vehicles 100 waiting for power supply facilities 200 to be brought into the vacant state (hereinafter, also referred to as "the number of waiting vehicles"). FIG. 7 shows exemplary coupons each having a usage value determined in this way. In FIG. 7, a "first coupon" represents the coupon issued in S17 (after the first notification), whereas a "second coupon" represents the coupon issued in S27 (after the second notification). A monetary amount in FIG. 7 represents a discount monetary amount of each coupon.

With reference to FIG. 7, in this example, as the number of vacant facilities is smaller or the number of waiting vehicles is larger, the usage value of each of the first coupon and the second coupon is set to be higher. For example, as the number of vacant facilities become smaller to be 3, 2, and 1, the discount monetary amount of the first coupon becomes higher to be 200 JPY, 400 JPY, and 600 JPY, respectively. Moreover, the discount monetary amount of the first coupon is 800 JPY when the number of waiting vehicles is small (for example, when the number of waiting vehicles is less than a predetermined value), whereas the discount monetary amount of the first coupon is 1000 JPY when the number of waiting vehicles is large (for example, when the number of waiting vehicles is more than or equal to the predetermined value). The usage value of the first coupon is set to be higher than the usage value of the second coupon. In the example of FIG. 7, the discount monetary amount of the first coupon is set to be twice as large as the discount monetary amount of the second coupon.

It should be noted that when the number of waiting vehicles is more than or equal to 1, the number of vacant facilities is 0. In the above-described embodiment, since three power supply facilities 200 are installed in parking area 12, the maximum number of vacant facilities is "3". For example, server 300 can obtain the number of vacant facilities using: the starting signal obtained from each power supply facility 200 in parking area 12; and the determination result in S25 of FIG. 6. The transmission of the starting signal from power supply facility 200 to server 300 means that power supply facility 200 starts to be used. Moreover, the determination of YES in S25 means that the use of power supply facility 200 is ended. For example, server 300 can obtain the number of waiting vehicles by determining, using respective pieces of vehicle location information obtained from vehicles 100 around power supply facilities 200, whether or not each of vehicles 100 is waiting for a power supply facility 200 to become available. Moreover, when the user can make a reservation to use a power supply facility 200 through the application of user terminal 400, server 300 can obtain the number of waiting vehicles using the number of users who have made reservations through the application.

The issuance of the coupon can be omitted appropriately. Even when no coupon is issued, a sufficient effect may be obtained only with the first notification and the second notification, depending on a type of business to which the charging system is applied, a purpose of introducing the system, and a place (that is, an environment) in which power supply facility 200 is installed, and the like.

The user condition is not limited to the condition employed in the above-described embodiment as long as the user condition is a notification condition that can be set by the user input onto the mobile terminal. The user condition can be changed appropriately. Also, the system condition is not limited to the condition employed in the above-described embodiment as long as the system condition is a notification condition set in the server in advance. The system condition can be changed appropriately. For example, the system condition may be satisfied only when the facility usage time reaches a predetermined threshold value. When the system condition is satisfied, only the second notification may be provided without stopping the charging. Moreover, the system condition may be satisfied only when power storage device 130 is fully charged during the external charging.

The system condition may be satisfied when the SOC of power storage device 130 during the external charging reaches a target SOC indicating a fully charged state, and the user condition may be satisfied when the SOC of power storage device 130 during the external charging reaches a threshold value of less than the target SOC. In such a charging system, when power storage device 130 is fully charged, the second notification is provided. Accordingly, the use of power supply facility 200 can be suppressed from being continued even when the charging has been completed. Moreover, some users may wish to stop the external charging before being fully charged. For each of such users, the first notification can be provided at an earlier timing, whereby the user turnover rate of power supply facility 200 can be increased.

The user condition may be set using a plurality of types of charging parameters (parameters about the external charging). Moreover, user terminal 400 may set, in server 300, a priority of each of the plurality of types of charging parameters by way of the user input. For example, the user may be able to select two or more parameters in the user setting screen, and may be able to set a threshold and a priority of each selected parameter. Server 300 may determine a content to be notified by the first notification, using the value and priority of each of the plurality of types of charging parameters. According to the charging system (hereinafter, also referred to as "charging system according to a modification") having such a configuration, the first notification suitable for the user's desire can be provided, with the result that the user's convenience can be improved more.

FIG. 8 illustrates the charging system according to the modification. With reference to FIG. 8, in this example, in the user setting screen, the user selects the SOC during charging and the fee for charging, sets respective threshold values X2, X3 for the SOC during charging and the fee for charging, and sets a "low" priority on the SOC during charging and a "high" priority on the fee for charging. The user sets the higher priority on the fee for charging than the priority on the SOC during charging. With the above-described setting, the user condition, which is satisfied when the SOC during charging reaches threshold value X2 or when the fee for charging reaches threshold value X3, is set in user terminal 400 (that is, server 300). Server 300 can change the content to be notified by the first notification between a case where the user condition is satisfied because the SOC during charging has reached threshold value X2 and a case where the user condition is satisfied because the fee for charging has reached threshold value X3. Server 300 determines the content to be notified by the first notification, using each of the values and priorities of the SOC during charging and the fee for charging. More specifically, when the SOC during charging with the low priority reaches threshold value X2, a message such as "CHARGING WILL BE COMPLETED SOON" is employed as the content to be notified by the first notification, thus providing a report to the user. On the other hand, when the fee for charging with the high priority reaches threshold value X3, a message such as "PLEASE STOP CHARGING" is employed as the content to be notified by the first notification, thus providing an instruction to the user.

FIG. 9 is a flowchart for illustrating a procedure of external charging control performed by server 300 of the charging system according to the modification. Server 300 performs the process of FIG. 9 instead of the process of FIG. 6. In the process of FIG. 9, S14, S16, S17 and S24 to S27 in the process of FIG. 6 are omitted, and S121, S122, S131, and S132 are employed instead of S12 and S13.

With reference to FIG. 9, after the process of S11, server 300 determines in S121 whether or not the value of the SOC during charging is more than or equal to threshold value X2 (for example, 50%). When the value of the SOC during charging is more than or equal to threshold value X2 (YES in S121), server 300 provides the above-described report (for example, the presentation of the message such as "CHARGING WILL BE COMPLETED SOON") to the user by way of the first notification in S131, and then the process proceeds to S122. On the other hand, when the value of the SOC during charging is less than threshold value X2 (NO in S121), the process proceeds to S122 without performing S131 by server 300.

In S122, server 300 determines whether or not the value of the fee for charging is more than or equal to threshold value X3 (for example, 300 JPY). When the value of the fee for charging is more than or equal to threshold value X3 (YES in S122), server 300 provides the above-described instruction (for example, the presentation of the message such as "PLEASE STOP CHARGING") to the user by way of the first notification in S132, and then the process proceeds to S15. On the other hand, when the value of the fee for charging is less than threshold value X3 (NO in S122), the process proceeds to S15 without performing the process of S132 by server 300.

It should be noted that the user may be notified of the present value of the charging parameter (the SOC during charging or the fee for charging) in the first notification (S131, S132). Instead of or in addition to at least one of the SOC during charging and the fee for charging, at least one of the facility usage time and the amount of charged power may be employed.

The configuration of the charging system is not limited to the configuration shown in FIG. 1, and can be changed appropriately. For example, the installation location of server 300 is not limited to the inside of shop 11. For example, a part or whole of the function of server 300 may be provided outside shop 11. Moreover, the charging system is applied to not only the installation such as a shopping center but also any installations.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charging system comprising:
    a vehicle including a power storage device chargeable through external charging using power supplied from outside of the vehicle;
    a power supply facility that performs the external charging by supplying the power to the vehicle;
    a mobile terminal that receives a user input from a user of the vehicle and that provides a notification to the user; and
    a server that communicates with the mobile terminal, wherein
    the mobile terminal sets a first notification condition in the server in response to the user input,
    a second notification condition is set in the server,
    the server determines whether or not each of the first notification condition and the second notification condition is satisfied during the external charging,
    when the first notification condition is satisfied, the server provides a first notification to the user through the mobile terminal, and
    when the second notification condition is satisfied, the server provides a second notification to the user through the mobile terminal;
    wherein the power supply facility stops the external charging in response to a predetermined user operation, and
    when the second notification condition is satisfied during the external charging, the power supply facility stops the external charging while the power storage device is not fully charged without the user operation.

2. The charging system according to claim 1, wherein
    the first notification condition is set using a plurality of types of parameters about the external charging,
    the mobile terminal sets, in the server, a priority of each of the plurality of types of parameters in response to the user input, and
    the server determines a content to be notified by the first notification, using a value and the priority of each of the plurality of types of parameters.

3. The charging system according to claim 2, wherein the plurality of types of parameters include two or more types of parameters selected from a group consisting of (i) an SOC of the power storage device during the external charging, (ii) a time having passed since start of the external charging, (iii) an amount of integrated power supplied to the power storage device through the external charging since the start of the external charging, and (iv) a charging fee billed for the external charging.

4. The charging system according to claim 1, wherein
    the first notification condition is set using at least one of (i) an SOC of the power storage device during the external charging, (ii) a time having passed since start of the external charging, (iii) an amount of integrated power supplied to the power storage device through the external charging since the start of the external charging, and (iv) a charging fee billed for the external charging, and
    the second notification condition is set using at least one of (i) the SOC of the power storage device during the external charging, and (ii) the time having passed since the start of the external charging.

5. The charging system according to claim 1, wherein
    after providing the first notification, the server determines whether or not the user is present within a first range around the vehicle, and
    when it is determined that the user is present within the first range during a first period until passage of a predetermined time from the first notification, the server issues a first coupon to the user through the mobile terminal, the first coupon being usable at a shop located around the power supply facility.

6. The charging system according to claim 5, wherein
    a plurality of the power supply facilities are installed in a predetermined region around the shop, and
    the server determines a usage value of the first coupon, using at least one of (i) a number of available power supply facilities in a vacant state among the power supply facilities in the predetermined region and (ii) a number of vehicles waiting for the power supply facilities in the predetermined region to be brought into the vacant state.

7. The charging system according to claim 5, wherein
    after providing the second notification, the server determines whether or not the user is present within a second range around the vehicle,
    when it is determined that the user is present within the second range during a second period until passage of a predetermined time from the second notification, the server issues a second coupon to the user through the mobile terminal, the second coupon being usable at the shop, and
    a usage value of the first coupon is higher than a usage value of the second coupon.

* * * * *